3,196,177
XYLYLENEDIHYDRAZINES AND DERIVATIVES
Alexander R. Surrey, Albany, N.Y., assignor to Sterling Drug Inc., New York, N.Y., a corporation of Delaware
No Drawing. Filed May 9, 1963, Ser. No. 279,316
9 Claims. (Cl. 260—554)

This invention relates to xylylenedihydrazines and their derivatives.

Illustrative and preferred embodiments of my compounds are those of Formula I

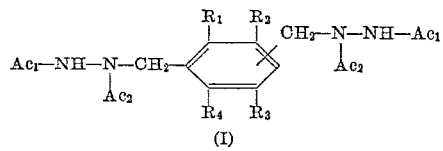

where $Ac_1$ is hydrogen or dihaloacetyl, $Ac_2$ is hydrogen, carbamyl or dihaloacetyl, and $R_1$, $R_2$, $R_3$ and $R_4$ are each hydrogen, lower-alkyl, lower-alkoxy or halogen.

In the above formula I, $R_1$, $R_2$, $R_3$ and $R_4$ can be the same or different. When representing lower-alkyl or lower-alkoxy, $R_1$, $R_2$, $R_3$ or $R_4$ can have from one to six carbon atoms, as illustrated by methyl, ethyl, n-propyl, isopropyl, n-butyl, isobutyl, 2-butyl, n-amyl, isoamyl, n-hexyl, and the like, for lower-alkyl, and by methoxy, ethoxy, n-propoxy, isopropoxy, n-butoxy, isobutoxy, 2-butoxy, n-amoxy, n-hexoxy, and the like, for lower-alkoxy; and, when representing halogen, each can be chloro, bromo, iodo or fluoro. Also, the halogens of the dihaloacetyl groups when one of the meanings for $Ac_1$ or $Ac_2$ in Formula I can be the same or different and can be chloro, bromo, iodo or fluoro.

The 1,4- and 1,3-xylylene moieties of the compounds of my invention, illustrated structurally by the following Formula II

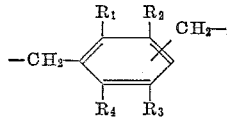

are well known in the art in the form of 1,4- and 1,3-xylylene dihalide derivatives. As shown below, these known dihalide derivatives are used as intermediates in the preparation of the dihydrazines of the instant invention, i.e., the compounds of Formula I were $Ac_1=Ac_2=H$.

The compounds of Formula I where $Ac_1=Ac_2=H$ were prepared by reacting the corresponding 1,4- or 1,3-xylylene dihalide, preferably dichloride because of its ready availability, with hydrazine hydrate. Reaction of the resulting dyhydrazines with an alkali metal cyanate, e.g., sodium or potassium cyanate, yielded the compounds of Formula I where $Ac_2$ is $CONH_2$ and $Ac_1$ is hydrogen.

The compounds of Formula I where $Ac_1$ is dihaloacetyl and $Ac_2$ is hydrogen were prepared by heating the corresponding dihydrazine (Formula I where $$Ac_1=Ac_2=H$$

in the form of its acid-addition salt, e.g., dihydrochloride, with two molar equavilent quantities of the appropriate dihaloacetyl halide, e.g., dichloroacetyl chloride, dibromoacetyl bromide, bromochloroacetyl chloride, diodoacetyl chloride and difluoroacetyl chloride.

The compounds of Formula I where $Ac_1$ is hydrogen and $Ac_2$ is dihaloacetyl were prepared by reacting, preferably between 0–5° C., the corresponding dihydrazine (Formula I where $Ac_1=Ac_2=H$) in its free base form with two molar equivalent quantities of the appropriate dihaloacetyl halide, e.g., dichloroacetyl chloride, dibromoacetyl bromide, bromochloroacetyl chloride, diiodoacetyl chloride and difluoroacetyl chloride.

The compounds of Formula I where $Ac_1=Ac_2=$dihaloacetyl were prepared by heating the corresponding dihydrazine (Formula I where $Ac_1=Ac_2=H$) with four molar equivalent quantities of the appropriate dihaloacetyl halide. Alternatively, the compounds where $Ac_1$ and $Ac_2$ are the same or different can be prepared by reacting the compounds of Formula I where $Ac_1$ is dihaloacetyl and $Ac_2$ is hydrogen with two molar equivalent quantities of the appropriate dihaloacetyl halide.

Also encompassed by my invention is bis(salicylaldehyde)-1,4-xylylenedihydrazone which was prepared by reacting 1-4-xylylenedihydrazine with salicylaldehyde.

The compounds of my invention are useful in the free base form or in the form of their acid-addition salts, and both forms are within the purview of the invention, and, in fact, are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, therapeutically acceptable salts, that is, salts whose anions are relatively innocuous to the animal organism in therapeutic doses of the salts, so that the beneficial properties inherent in the free base are not vitiated by side effects ascribably to the anions; in other words, the latter do not substantially affect the therapeutic properties inherent in the cations. In practicing my invention, I found it convenient to employ the hydrochloride salt. However, other appropriate therapeutically acceptable salts within the scope of the invention are those derived from mineral acids, such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, quinic acid, and the like, giving the hydrobromide, hydriodide, nitrate, phosphate, sulfamate, sulfate, acetate, citrate, tartrate, lactate, methanesulfonate, ethanesulfonate and quinate, respectively.

The acid-addition salts are isolated directly from the reaction mixture, as illustrated below in Example 1, or are prepared by reacting the free base and acid in an appropriate solvent, aqueous or organic, e.g., water, ethanol, or mixtures thereof, in which case the salt separates directly or can be obtained by concentration of the solution.

Although therapeutically acceptable salts are preferred, all acid-addition salts are within the scope of my invention. All acid-addition salts are useful as sources of the free base form even if the particular salt per se is not desired as the final product, as for example when the salt is formed for purposes of purification or identification or when it is used as an intermediate in preparing a therapeutically acceptable salt by ion exchange procedures.

My compounds have been tested by standard therapeutic procedures and found to possess various therapeutic properties, e.g., antibacterial, amebacidal, monoamine oxidase inhibition. For example, when tested according to standard in vitro bacteriological evaluation procedures, they were found to possess antibacterial activity, e.g., against *Staphylococcus aureus, Clostridium welchii, Eberthella typhi, Mycobacterium tuberculosis* and *Pseudomonas aeruginosa*, at test concentration levels in the range of 0.005 mg./cc. to about 1.0 mg./cc., as illustrated below in the examples.

The molecular structures of the compounds of my invention are established by their modes of syntheses and confirmed by the correspondence of calculated and found values for the elementary analyses for representative examples and by infrared spectral analyses.

The following examples will further illustrate the invention without, however, limiting it thereto.

EXAMPLE 1

To a solution containing 17.5 g. of 1,4-xylylene dichloride dissolved in 100 cc. of acetonitrile heated to 95° C. on a steam bath was added with stirring 150 g. of hydrazine. The reaction mixture was then refluxed for three hours after which the solvent was removed by distillation. The remaining material was boiled with absolute ethanol; then the clear solution was decanted and allowed to cool. The resulting crystalline product was recrystallized once from ethanol and once from isopropyl alcohol-water to yield 1.6 g. of the product, 1,4-xylylenedihydrazine dihydrochloride, M.P. 233.2–240.4° C. (corr.).

Following the procedure described in Example 2 and using 17.5 g. of 1,4-xylylene dichloride, 400 g. of hydrazine hydrate and 100 cc. of tetrahydrofuran, there was obtained 11.4 g. of 1,4-xylylenedihydrazine dihydrochloride after one recrystallization from ethanol-water.

The same product is obtained as its dihydrobromide or dihydroiodide following the above procedure and using molar equivalent quantities of 1,4-xylylene dibromide or 1,4-xylylene diiodide, respectively, in place of 1,4-xylylene dichloride.

1,3-xylylenedihydrazine can be obtained following the procedure of Example 1 or 2 using the same quantity of a 1,3-xylylene dihalide, e.g., dichloride, in place of the corresponding 1,4-xylylene dihalide.

1,4-xylylenedihydrazine dihydrochloride when tested according to standard in vitro bacteriological procedures was found to possess bacteriostatic and bacteriocidal activities against *Mycobacterium tuberculosis* at a concentration of 0.005 mg./cc.

When tested as a monoamine oxidase inhibitor by standard biochemical evaluation procedures, 1,4-xylylenedihydrazine dihydrochloride was found to be equal in activity in vivo and in vitro to 1-isonicotinoyl-2-isopropylhydrazine.

EXAMPLE 2

To a solution heated to 100° C. and containing 17.5 g. of 1,4-xylylene dichloride dissolved in 100 cc. of tetrahydrofuran was added with stirring over a period of about ninety minutes 400 g. of hydrazine hydrate. The reaction mixture was filtered and the filtrate concentrated in vacuo to remove the excess hydrazine hydrate. The remaining material was triturated with absolute ethanol and then collected by filtering. The solid was dissolved in water, the aqueous solution treated with decolorizing charcoal, filtered, and the filtrate treated with concentrated hydrochloric acid. The resulting precipitate was collected, washed with absolute ethanol, recrystallized from ethanol and dried at 60° C. in vacuo overnight to yield 9.5 g. of the product, 2,5-dimethyl-1,4-xylylenedihydrazine dihydrochloride, M.P. >300° C. (corr.).

2,5-dimethyl-1,4-xylylenedihydrazine was found to have in vitro bacteriostatic activity against *Staphylococcus aureus, Eberthella typhi, Clostridium welchii* and *Pseudomonas aeruginosa* at respective concentrations of 0.1, 0.5, 0.25 and 0.5 mg./cc. It was found to be equal in activity to 1-isonicotinoyl-2-isopropylhydrazine when tested in vitro as a monoamine oxidase inhibitor.

EXAMPLE 3

Solutions containing 12 g. of 1,4-xylylenedihydrazine dihydrochloride in 150 cc. of water and 8.1 g. of potassium cyanate in 150 cc. of water were combined with stirring. The resulting white precipitate was collected, washed with water, recrystallized from water and dried at 60° C. in vacuo to yield 3.1 g. of the product, 1,4-xylylenebis(2'-semicarbazide), M.P. 230.0–230.8° C. (corr.) with decomposition. This compound's bis(1'-benzal) derivative, M.P. 262–263° C. with decomposition, was prepared by heating a small quantity of it in aqueous ethanol containing a drop of acetic acid with two molar equivalent quantities of benzaldehyde.

1,4-xylylenebis(2'-semicarbazide) was found to have in vitro bacteriostatic activity against *Staphylococcus aureus, Eberthella typhi, Clostridium welchii* and *Pseudomonas aeruginosa* at respective concentrations of 1.0, 0.5, 0.5 and 0.75 mg./cc.

EXAMPLE 4

A mixture containing 4.8 g. of 1,4-xylylenedihydrazine dihydrochloride, 6.0 g. of dichloroacetyl chloride and 150 cc. of toluene was refluxed for six hours and then cooled. The solid was collected, washed with toluene and air-dried. The solid was stirred with water at room temperature for about thirty minutes, collected by filtering, washed with water and air-dried. The solid was then recrystallized from acetonitrile and dried at 98° C. in vacuo for three days to yield 3.5 g. of the product, 1,4-xylylenebis(2'-dichloroacetylhydrazine) dihydrochloride, M.P. 277.4–279.0° C. (corr.) with decomposition. The structure of this compound was confirmed by its infrared spectral analysis.

1,4-xylylenebis(2'-dichloroacetylhydrazine) dihydrochloride was found to have in vitro bacteriostatic and bacteriocidal activities against *Clostridium welchii* at the same concentration of 0.75 mg./cc. When administered orally to hamsters infected with *Endamoeba criceti*, this compound was found to clear two out of four of the animals tested at a dose level of 100 mg./kg./day.

Following the above procedure but using dibromoacetyl bromide, bromochloroacetyl chloride, diiodoacetyl chloride or difluoroacetyl chloride in place of dichloroacetyl chloride, there can be obtained, respectively, 1,4-xylylenebis(2'-dibromoacetylhydrazine) dihydrobromide, 1,4-xylylenebis(2'-bromochloroacetylhydrazine) dihydrochloride, 1,4-xylylenebis(2'-diiodoacetylhydrazine) dihydrochloride or 1,4-xylylenebis(2'-difluoroacetylhydrazine).

EXAMPLE 5

A mixture containing 5.0 g. of 1,4-xylylenedihydrazine dihydrochloride, 15 g. of dichloroacetyl chloride and 150 cc. of toluene was refluxed with stirring overnight. The reaction mixture was allowed to cool and then the solid was collected, washed with toluene and air-dried to yield 12.1 g. of the product. A portion of this product was recrystallized from acetic acid and then dried in a vacuum oven at 90° C. to yield 3.2 g. of the product, 1,4-xylylenebis[1',2'-bis(dichloroacetyl)hydrazine], M.P. 269.0–270.2° C. (corr.) with decomposition.

1,4-xylylenebis[1',2'-bis(dichloroacetyl)hydrazine] was found to have in vitro bacteriostatic activity against *Staphylococcus aureus, Eberthella typhi, Clostridium welchii* and *Pseudomonas aeruginosa* at respective concentrations of 0.076, 0.076, 0.1 and 0.1 mg./cc.

EXAMPLE 6

A 17.6 g. portion of sodium hydroxide was dissolved in 400 cc. of cold water. To this solution was added 200 cc. of ethylene dichloride and the mixture stirred in an ice-salt bath until the temperature reached 0° C. To the mixture was added 23.9 g. of 1,4-xylylenedihydrazine dihydrochloride and the mixture again allowed to cool to 0° C. To the mixture containing 1,4-xylylenedihydrazine in free base form was added dropwise a solution containing 32.4 g. of dichloroacetyl chloride dissolved in 50 cc. of ethylene dichloride with stirring over a period of ninety minutes, maintaining the temperature between 0–3° C. After the addition, the reaction mixture was stirred for one hour with the ice bath removed. The reaction mixture was filtered and the solid that was collected was recrystallized from acetonitrile using decolorizing charcoal and dried in vacuo at 70° C. overnight to yield 3.3 g. of the product, 1,4-xylylenebis(1'-dichloroacetylhydrazine), M.P. 205.2–206.4° C. (corr.) with decomposition. The structure of this compound was confirmed by its infrared spectral analysis.

1,4-xylylenebis(1'-dichloroacetylhydrazine) was found to have in vitro bacteriostatic activity against *Eberthella typhi* and *Clostridium welchii* at respective concentrations of 0.1 and 0.05 mg./cc.

EXAMPLE 7

A 2.4 g. portion of 1,4-xylylenedihydrazine and 2.6 g. of sodium acetate were dissolved in 100 cc. of water. To this solution was added a solution containing 2.4 g. of salicylaldehyde dissolved in 10 cc. of ethanol. The resulting mixture was heated on a steam bath with stirring for about thirty minutes. The reaction mixture was allowed to cool; then the solid that separated was collected, washed well with water, recrystallized from acetic acid, and dried in vacuo at 90° C. to yield 2.4 g. of the product, bis(salicylaldehyde)-1,4-xylylenedihydrazone, M.P. 181.0–181.8° C. (corr.).

Bis(salicylaldehyde) - 1,4 - xylylenedihydrazone when tested according to standard in vitro bacteriological procedures was found to possess antibacterial activity, for example, as follows:

| Organism | Minimum Effective Concentration (mg./cc.) | |
|---|---|---|
| | Bacteriostatic | Bacteriocidal |
| *Staphylococcus aureus* | 0.025 | 0.076 |
| *Eberthella typhi* | 0.050 | 0.1 |
| *Clostridium welchii* | 0.076 | 0.1 |
| *Pseudomonas aeruginosa* | 0.076 | 0.1 |

Following the procedures described in Example 1 or 2 and using corresponding molar equivalent quantities of the appropriate 1,4- or 1,3-xylylene dihalide, the compounds of Table A can be prepared; these compounds can be isolated in free base form or in the form of an acid-addition salt, e.g., dihydrochloride.

Table A

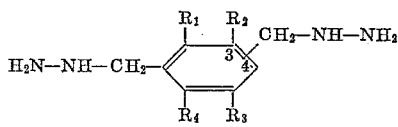

| Example | R₁ | R₂ | R₃ | R₄ | Position of 2nd CH₂NHNH₂ |
|---|---|---|---|---|---|
| 8 | Cl | H | H | H | 4 |
| 9 | Cl | H | 3-Cl | H | 4 |
| 10 | Cl | Cl | 3-Cl | H | 4 |
| 11 | Cl | Cl | 3-Cl | Cl | 4 |
| 12 | F | H | H | H | 4 |
| 13 | CH₃ | CH₃ | 3-CH₃ | CH₃ | 4 |
| 14 | C₂H₅ | H | 3-C₂H₅ | H | 4 |
| 15 | C₂H₅ | C₂H₅ | 3-C₂H₅ | C₂H₅ | 4 |
| 16 | n-C₄H₉ | n-C₄H₉ | 3-n-C₄H₉ | n-C₄H₉ | 4 |
| 17 | OCH₃ | H | 3-OCH₃ | H | 4 |
| 18 | OC₂H₅ | H | 3-OC₂H₅ | H | 4 |
| 19 | OC₄H₉-n | H | 3-OC₄H₉-n | H | 4 |
| 20 | Cl | H | H | H | 3 |
| 21 | H | Cl | H | H | 3 |
| 22 | H | Cl | H | Cl | 3 |
| 23 | H | CH₃ | H | CH₃ | 3 |
| 24 | CH₃ | CH₃ | H | CH₃ | 3 |
| 25 | OCH₃ | H | 4-OCH₃ | H | 3 |
| 26 | H | H | 4-t-C₄H₉ | H | 3 |
| 27 | Br | H | 4-t-C₄H₉ | H | 3 |
| 28 | CH₃ | OCH₃ | H | CH₃ | 3 |

Following the procedures of Examples 3–6 and using molar equivalent quantities of the dihydrazines of Table A, the corresponding dihaloacetyl and carbamyl derivatives can be prepared.

I claim:

1. A compound of the formula

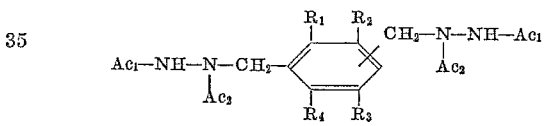

where Ac₁ is selected from the group consisting of hydrogen and dihaloacetyl, Ac₂ is selected from the group consisting of hydrogen, carbamyl and dihaloacetyl, and R₁, R₂, R₃ and R₄ are each selected from the group consisting of hydrogen, lower-alkyl, lower-alkoxy and halogen.

2. 1,4-xylylenedihydrazine.
3. 1,3-xylylenedihydrazine.
4. 2,5-dimethyl-1,4-xylylenedihydrazine.
5. 1,4-xylylenebis(2'-semicarbazide).
6. 1,4-xylylenebis(2'-dichloroacetylhydrazine).
7. 1,4-xylylenebis[1',2'-bis(dichloroacetyl)hydrazine].
8. 1,4-xylylenebis(1'-dichloroacetylhydrazine).
9. Bis(salicylaldehyde)-1,4-xylylenedihydrazone.

References Cited by the Examiner

Schoutissen: Rec. Trav. Chim., Volume 53 (1934), pages 561–66.

Wieland et al.: Chemische Berichte, Volume 64B (1931), pages 2513–16.

NICHOLAS S. RIZZO, *Primary Examiner.*